(12) United States Patent
Kim et al.

(10) Patent No.: US 7,697,625 B2
(45) Date of Patent: Apr. 13, 2010

(54) METHOD AND SYSTEM FOR TRANSMITTING AND RECEIVING DATA STREAMS

(75) Inventors: Bong Hoe Kim, Gyeonggi-do (KR); Dong Youn Seo, Seoul (KR); Joon Kui Ahn, Seoul (KR); Hak Seong Kim, Seoul (KR); Seung Hwan Won, Gyeonggi-do (KR); Dong Wook Roh, Seoul (KR)

(73) Assignee: LG Electronics Inc., Seoul (KR)

( * ) Notice: Subject to any disclaimer, the term of this patent is extended or adjusted under 35 U.S.C. 154(b) by 1044 days.

(21) Appl. No.: 11/058,490

(22) Filed: Feb. 14, 2005

(65) Prior Publication Data

US 2005/0195912 A1 Sep. 8, 2005

Related U.S. Application Data

(60) Provisional application No. 60/543,404, filed on Feb. 11, 2004.

(30) Foreign Application Priority Data

| Feb. 12, 2004 | (KR) | ..................... 10-2004-0009397 |
| Jul. 14, 2004 | (KR) | ..................... 10-2004-0054802 |

(51) Int. Cl.
H04B 7/02 (2006.01)
(52) U.S. Cl. .................. 375/267; 375/299; 455/69; 455/101
(58) Field of Classification Search .................. 375/267, 375/299; 455/69, 101
See application file for complete search history.

(56) References Cited

U.S. PATENT DOCUMENTS 7,155,177 B2 * 12/2006 Jootar et al. ................. 455/101

| 2002/0102950 | A1 | 8/2002 | Gore et al. |
| 2002/0196842 | A1 | 12/2002 | Onggosanusi et al. |
| 2003/0060173 | A1 * | 3/2003 | Lee et al. ..................... 455/103 |
| 2003/0073410 | A1 * | 4/2003 | Hottinen et al. ............... 455/69 |
| 2003/0126536 | A1 * | 7/2003 | Gollamudi et al. .......... 714/748 |

(Continued)

FOREIGN PATENT DOCUMENTS

WO    WO 02/03568 A1    1/2002

(Continued)

OTHER PUBLICATIONS

Kim, H-S et al. "Optimal Antenna Selection Scheme with Transmit Adaptive Array for Wideband CDMA Systems" Jun. 2003.

*Primary Examiner*—Shuwang Liu
*Assistant Examiner*—David Huang
(74) *Attorney, Agent, or Firm*—McKenna Long & Aldridge LLP (57) ABSTRACT

A method and system for transmitting and receiving data using a plurality of antennas are disclosed. The method of transmitting includes the steps of receiving feedback information from a receiving end, the feedback information including group selection information and weight values for the plurality of antennas, grouping the plurality of antennas into a plurality of antenna groups based on the group selection information included in the feedback information, and transmitting, to a receiving end, a plurality of data streams through the plurality of antenna groups, respectively, based on the weight values.

10 Claims, 6 Drawing Sheets

U.S. PATENT DOCUMENTS

| | | | |
|---|---|---|---|
| 2003/0148770 A1* | 8/2003 | Das et al. | 455/455 |
| 2004/0125900 A1* | 7/2004 | Liu et al. | 375/347 |
| 2005/0157807 A1* | 7/2005 | Shim et al. | 375/267 |
| 2006/0098754 A1* | 5/2006 | Kim et al. | 375/267 |

FOREIGN PATENT DOCUMENTS

| | | |
|---|---|---|
| WO | WO 02/082689 A2 | 10/2002 |

\* cited by examiner

METHOD AND SYSTEM FOR TRANSMITTING AND RECEIVING DATA STREAMS

CROSS REFERENCE TO RELATED APPLICATIONS

This application claims the benefit of Korean Application No. 10-2004-0009397 and 10-2004-0054802 filed on Feb. 12, 2004 and Jul. 14, 2004, respectively, which are hereby incorporated by reference.

This application claims the benefit of U.S. Provisional Application No. 60/543,404, filed on Feb. 11, 2004, in the name of inventors Bonghoe KIM, Dongyoun SEO, and Hyounghee KOO, titled "METHOD OF CLOSED LOOP STTD WITH SUBGROUP RATE CONTROL . . . TxAA WITH SUBGROUP RATE CONTROL WITH MULTIPLE TRANSMIT AND RECEIVE ANTENNAS," which is hereby incorporated by reference.

BACKGROUND OF THE INVENTION

1. Field of the Invention

The present invention relates to a transmission system and more particularly, to a method of transmitting and receiving data streams using a plurality of antennas. Although the present invention is suitable for a wide scope of applications, it is particularly suitable for grouping a plurality of antennas into sub-groups of antennas based on an antenna combination having a maximum data throughput and transmitting such information. Moreover, it is suitable for transmitting a plurality of data streams based on weight values for each antenna. The related arts do not show such features of applying weight values to transmitting antennas and grouping antenna combinations to determine a combination having a maximum data throughput.

2. Discussion of the Related Art

In a transmission diversity (Tx diversity) scheme, a single data stream is transmitted using at least two antennas via independent channel. The signals corresponding to the data stream suffer different channel environment and are received in a receiving antenna. In a receiving end, the signals suffering different channel are combined and decoded. Because it is more efficient to decode combined signals than a single signal, the receiving end can acquire efficiency in decoding, called diversity gain.

As another aspect of diversity scheme, a spatial multiplexing method has been proposed. In the spatial multiplexing system, at least two independent data streams are transmitted using at least two transmitting antennas respectively. In a receiving end, at least two antennas are introduced, and each antenna receives at least two signals simultaneously. Therefore, the received signals must be recovered separately with a detection algorithm for each signal. The separated signal is decoded independently. In this method, each signal is transmitted independently so different modulation or coding scheme is applicable to each signal.

In the existing diversity schemes, data streams are transmitted via a fixed set of antennas without regard to a potentially more efficient and effective antenna combination. As a result, transmission may suffer inefficiency and delays due to underutilization of antennas and overuse of other antennas. Moreover, time and resources could be wasted. Therefore, the amount of data transmitted suffers.

For example, in a system having four antennas in a transmitting end which are set to transmit data stream 1 from antennas 1 and 2 and data stream 2 from antennas 3 and 4, other antenna configuration is not considered. If antennas 1 and 2 have strong signal strength compared to antennas 3 and 4, yet data stream 1 does not have much data to transmit whereas data stream 2 does, the fixed configuration would cause delays in transmitting data stream 2 due to weak signals and data overload. On the contrary, antennas 1 and 2 do not have much data to transmit, resulting in underutilization of resources.

Another disadvantage of the existing diversity scheme is that antenna signal strengths are not considered prior to transmitting data through them. In other words, data is transmitted through an antenna regardless of the transmission rate of that antenna. As a result, inefficient as well as ineffective data transmission could occur. In addition, the amount of data transmitted suffers.

For example, in a system having two antennas, the transmission signal strength of antenna 1 is strong while antenna 2 has weak signal strength. By transmitting a data stream through both antennas, the transmission in antenna 2 would suffer and considered inefficient.

SUMMARY OF THE INVENTION

Accordingly, the present invention is directed to a [title] that substantially obviates one or more problems due to limitations and disadvantages of the related art.

An object of the present invention is to provide a method of transmitting and receiving data streams having weight values applied to the data streams and selecting a group of antennas providing a maximum data throughput.

Another object of the present invention is to provide a method of transmitting and receiving data streams by having weight values applied thereto.

Another object of the present invention is to provide a method of transmitting and receiving data streams by selecting a group of antennas providing a maximum data throughput.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for transmitting data streams using a plurality of antennas include the step of receiving feedback information from a receiving end, where the feedback information includes group selection information and weight values for the plurality of antennas. The method further includes the step of grouping the plurality of antennas into a plurality of antenna groups based on group selection information which is included in the feedback information. Furthermore, the method includes the step of transmitting to a receiving end a plurality of data streams through the plurality of antenna groups, respectively, based on the weight values.

In another aspect of the present invention, a method for receiving data streams using a plurality of antennas include estimating a channel status for each antenna. The method further includes the step of calculating a weight value and a Signal-to-Interference-plus-Noise Ratio (SINR) for each antenna using the estimated channel status and calculating a data throughput for each combination of antennas using the SINR. The method further includes the step of selecting a combination of antennas which provides the maximum data throughput from a plurality of antenna combinations. The method further includes the step of transmitting feedback information to a transmitting end in which the feedback information includes the calculated weight value for each antenna and the selected combination of antennas. Moreover, the method includes the step of receiving a plurality of data streams from the transmitting end, from which the plurality of data streams through selected combinations of antennas based on the weight value for each channel are transmitted.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

As a part of diversity transmission scheme, Space Time Transmit Diversity (STTD) and modes 1 and 2 of Transmit Antenna Array (TxAA) are widely used. The STTD scheme is an open loop technique using two antennas to exploit diversity. More specifically, the STTD employs space-time coding to achieve diversity. Furthermore, the STTD scheme is applicable to all of the downlink physical channel except Synchronization Channel (SCH) of Wideband Code Division Multiple Access (WCDMA). Because STTD scheme does not require feedback signal, delays caused by feedback transmission does not affect transmission in the STTD scheme. The operation of STTD is further explained using the following Table 1.

TABLE 1

|          | t      | t + T   |
|----------|--------|---------|
| Antenna 1 | $s_1$  | $s_2$   |
| Antenna 2 | $-s_2^*$ | $s_1^*$ |

In Table 1, t represents time and t+T represents time plus symbol transmission duration. The space-time coded symbols, as indicated in Table 1, are transmitted through transmission antennas 1 and 2. Each symbol is transmitted via independent channel. Assuming that the channel of time t and the channel of t+T are the same, the following equations in Equation 1 describes how the signals are received at the receiving end.

$$r_1 = r(t) = h_1 s_1 - h_2 s^*_2 + n_1$$

$$r_2 = r(t+T) = h_1 s_2 + h_2 s_1^* + n_2 \quad \text{[Equation 1]}$$

Here, $r_1$ and $r_2$ represent received signals at each antenna, and $h_1 = \alpha_1 e^{j\theta_1}$, $h_2 = \alpha_2 e^{j\theta_2}$ represent channels between the receiving antennas and each of the transmitting antennas 1 and 2. Furthermore, $n_1$ and $n_2$ represent noise in the receiving end.

In this diversity scheme, pilot signals are used to estimate each channel status. Furthermore, by combining received signals, as in Equation 2, the transmitted symbol can be estimated. For example, the estimated symbol has an effect of Maximum Ratio Combining (MRC).

$$\hat{s}_1 = h_1^* r_1 + h_2 r_2^* = (\alpha_1^2 + \alpha_2^2) s_1 + h_1^* n_1 + h_2 n_2^*$$

$$\hat{s}_2 = h_1^* r_2 - h_2 r_1^* = (\alpha_1^2 + \alpha_2^2) s_1 + h_1^* n_2 - h_2 n_1^* \quad \text{[Equation 2]}$$

In Equation 2, ŝ represents a decoded symbol at the receiving end, and h represents channel. Furthermore, r represents a received signal, α represents amplitude, s represents symbol transmitted from the transmission end, and n represents complex noise in the receiving end. Since there are two receiving antennas, two equations are presented accordingly in Equation 2.

For improved and efficient transmission, four transmit antennas can be used to achieve diversity for Multi-In Multi-Out (MIMO). This is possible in a Double-Space Time Transmit Diversity (D-STTD) scheme. In this scheme, for example, there are four transmit antennas to two receiving antennas are available.

Figure 1:
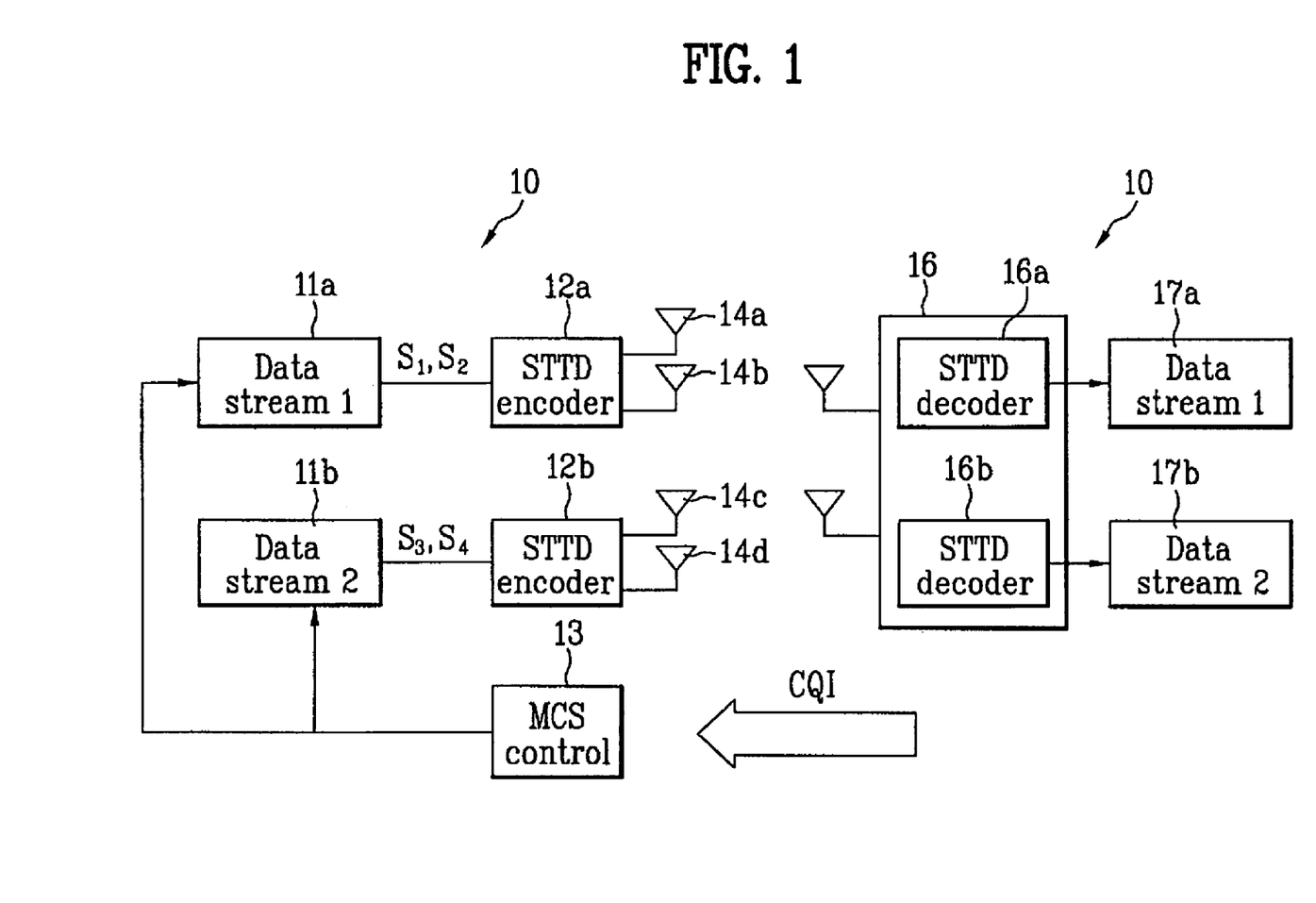
FIG. 1 illustrates a D-STTD scheme having four transmission antennas.

In the D-STTD scheme, the transmitted data is divided into two sub-groups and each sub-group is transmitted by STTD operation. More specifically, two data streams are space-time coded by the STTD encoder, and transmitted as space-time coded symbols via a plurality of antennas grouped in sub-groups, i.e., four antennas grouped in sub-groups of two. FIG. 1 illustrates this operation in detail.

FIG. 1 is a block diagram illustrating an open loop D-STTD scheme. As illustrated, a Modulation Code Set (MCS) control 13 is available to control modulation and coding rate to each set of data streams 11 based on Channel Quality Information (CQI) feedback. In other words, each modulation and coding rate can be independently changed based on the CQI feedback. Two independent data streams 11a and 11b are passed through respective STTD encoders 12a and 12b which perform space-time coding in a diversity scheme. Furthermore, four antennas 14a-d transmit the coded data streams.

In addition, the receiving end of the system includes two antennas 15a-b and STTD decoders 16a-b to receive the transmitted signal and perform decoding functions to transmitted data.

Figure 2:
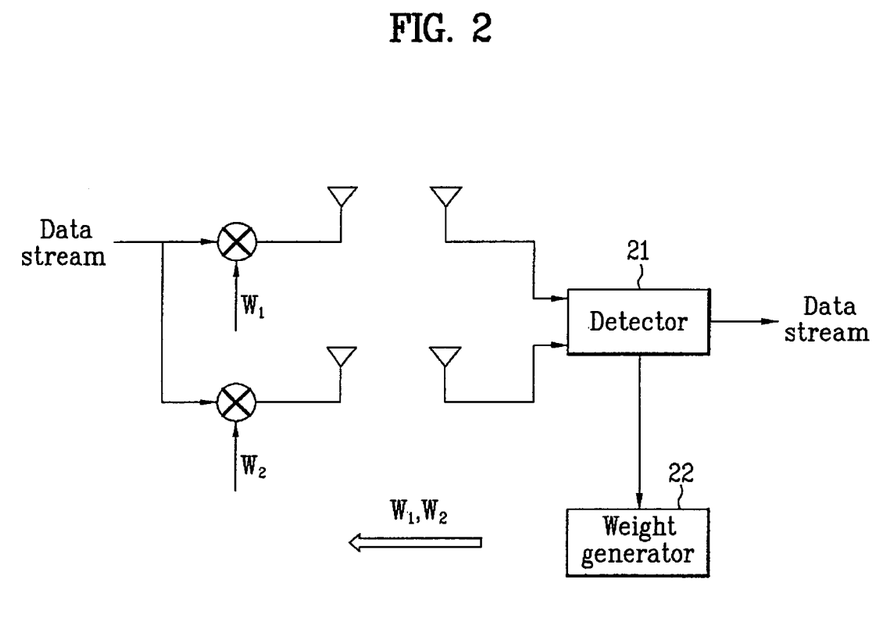
FIG. 2 illustrates a TxAA scheme having two transmission antennas.

As a closed loop technique employing feedback CQI, TxAA scheme also uses two antennas to exploit the diversity. FIG. 2 illustrates the operation in detail. In the receiving end of the TxAA scheme, a detector 21 estimates channel status using pilot signals. The estimated channel status information is used to calculate Signal-to-Interference-plus-Noise Ratio (SINR). Additionally, the estimated channel status information is used by a weight generator 22 to generate a weight value for each channel. The generated weight values, $w_1$ and $w_2$, are transmitted to the transmitting end to be applied to the data stream.

The weight values are applied to the data streams then transmitted to the receiving antennas. Assuming there are two receiving antennas, for example, the receiving signal of each antenna in the receiving end can be expressed in the following equation.

$$r_1=(w_1h_{11}+w_2h_{12})s+n$$
$$r_2=(w_1h_{21}+w_2h_{22})s+n_2 \quad \text{[Equation 3]}$$

In Equation 3, s represents a symbol transmitted from the transmitting end, $w_1$ and $w_2$ represent weights, $h_{11}$-$h_{22}$ represent transmission channels, and $n_1$ and $n_2$ represent the Additive White Gaussian Noise (AWGN).

In the receiving end, the original data needs to be extracted. To accomplish this, data symbol recovery is performed.

Pilot Channel (CPICH) and calculates weight values by which the reception signal power is maximized. The receiving end transmits phase and amplitude adjustment information based on the weight value.

As explained above, in mode 2, feedback information comprises phase information as well as amplitude information. The transmitting end, i.e., UMTS (Universal Mobile Telecommunication System) Terrestrial Radio Access Network (UTRAN), uses the following list (Table 1) to analyze the received information. In other words, the transmitting end can use 4 weight values for phase, with 1 bit feedback information, by using a constellation rotation method. To acquire the 4 weight values from the 1 bit feedback information, Table 2 can be used. That is, the transmitting end uses a fixed value, such as $w_1=1/\sqrt{2}$ for a weight value of a first antenna, and interprets the received feedback information according to Table 2 which shows the mapping between phase adjustment, $\phi_i$, and received feedback information for each time slot.

TABLE 2

| Slot # | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| FSM | 0 | 0 | π/2 | 0 | π/2 | 0 | π/2 | 0 | π/2 | 0 | π/2 | 0 | π/2 | 0 | π/2 | 0 |
|  | 1 | π | −π/2 | π | −π/2 | π | −π/2 | π | −π/2 | π | −π/2 | π | −π/2 | π | −π/2 | π |

Accordingly, data symbol recovery in the receiving end can be determined using the following equation.

$$\hat{s}=(w_1h_{11}+w_2h_{12})^*r_1+(w_1h_{21}+w_2h_{22})^*r_2 \quad \text{[Equation 4]}$$

In Equation 4, $\hat{s}$ represents a decoded symbol at the receiving end, $h_{11}$-$h_{22}$ are channels, $r_1$ and $r_2$ represent the received signal at each receiving antenna, and $w_1$ and $w_2$ represent weight values.

Before weight values can be fed back to the transmission end, the receiving end generates weight values. An example of acquiring a weight value is through determining an eigenvector. More specifically, an eigenvector corresponding to the maximum eigenvalue from a channel covariance matrix. The following equation is an example of determining a weight value.

$$\underline{R}\underline{w}=\lambda\underline{w} \quad \text{[Equation 5]}$$

In Equation 5, R is a covariance matrix, $\underline{w}$ is a weight vector, and λ represents a maximum value of the covariance matrix.

In the TxAA scheme, two modes can be found; namely, mode 1 and mode 2. The difference between the two modes lies in a method of acquiring a weight vector. More specifically, in mode 1, a weight vector is expressed in 1 bit, while mode 2 expresses a weight vector in 4 bits.

Mode 1 of the TxAA scheme employs a closed loop technique to feedback weight values. In mode 1, 1 bit phase information is transmitted to the receiving end during each time slot without amplitude information. In mode 2, 4 bits are transmitted to the receiving end during each time slot, of which 1 bit has phase information and 3 bits have amplitude information.

In mode 1, pilot symbols which are orthogonal to each other transmitted through each of two antennas on a Dedicated Physical Control Channel (DPCCH). In mode 2, the same dedicated pilot symbols are transmitted through two antennas in the DPCCH.

The receiving end estimates each channel corresponding to each antenna for each time slot using signals on a Common As explained above, the weight value of the first antenna $w_1$ is a constant, $w_1=1/\sqrt{2}$. The weight $w_2$ is then calculated by averaging the received phases over two consecutive slots. Algorithmically, $w_2$ is calculated as follows.

$$w_2 = \frac{\sum_{i=n-1}^{n}\cos(\phi_i)}{2} + j\frac{\sum_{i=n-1}^{n}\sin(\phi_i)}{2} \quad \text{[Equation 6]}$$

In mode 1 at frame border, the averaging operation is slightly modified. Upon reception of the feedback command for slot 0 of a frame, the average is calculated based on the command for slot 13 of the previous frame and the command for slot 0 of the current frame. In other words, frame information from slot 14 is not used. The reason for this is to come up with the average value based on $(0, \pi)$ and $(\pi/2, -\pi/2)$. The average can be acquired through the following equation.

$$w_2 = \frac{\cos(\phi_{13}^{j-1})+\cos(\phi_0^j)}{2} + j\frac{\sin(\phi_{13}^{j-1})+\sin(\phi_0^j)}{2} \quad \text{[Equation 7]}$$

In Equation 7, $\Phi_o^j$ represents phase adjustment from frame j−1, slot 13, and $\Phi_{13}^{j-1}$ represents phase adjustment from frame j, slot 0.

For the first frame of transmission, the receiving end determines the feedback commands in a normal way and send them to UTRAN. Before the first feedback command is received, the UTRAN shall use the initial weight, $$w_2 = \frac{(1+j)}{2}.$$

Having received the feedback command, the UTRAN calculates $w_2$ according to the following equation.

$$w_2 = \frac{\cos(\pi/2) + \cos(\phi_0)}{2} + j\frac{\sin(\pi/2) + \sin(\phi_0)}{2} \quad \text{[Equation 8]}$$

In Equation 8, $\phi_0$ represents phase adjustment from slot 0 of the first frame.

Like mode 1, mode 2 of the TxAA scheme employs a closed loop technique to achieve diversity. In this closed loop mode, there are 16 possible combinations of phase and power adjustment from which the receiving end selects and transmits the FSM according to Table 3 and Table 4. In contrast from mode 1, no constellation rotation is done at the receiving end and no filtering of the received weights is performed at the UTRAN.

TABLE 3

| $FSM_{po}$ | Strength of Antenna 1 | Strength of Antenna 2 |
|---|---|---|
| 0 | 0.2 | 0.8 |
| 1 | 0.8 | 0.2 |

TABLE 4

| $FSM_{ph}$ | Phase Difference Between Antennas (radians) |
|---|---|
| 000 | $\pi$ |
| 001 | $-3\pi/4$ |
| 011 | $-\pi/2$ |
| 010 | $-\pi/4$ |
| 110 | 0 |
| 111 | $\pi/4$ |
| 101 | $\pi/2$ |
| 100 | $3\pi/4$ |

In the first bit, since all the information can be combined, a maximum value can be selected from 16 weight values. In the next bit, where the previously determined bit is fixed, a maximum weight value can be found in order of 8>4>2 combinations.

By using the phase and weight information, weight vector $\underline{w} = [w_1 \ w_2]^T$ can be determined. See Equation 9.

$$w = \begin{bmatrix} \sqrt{\text{power\_ant1}} \\ \sqrt{\text{power\_ant2}} \exp(j \ \text{phase\_diff}) \end{bmatrix} \quad \text{[Equation 9]}$$

In a 15 slot configuration, 4 bit feedback information gets transmitted through four slots. As a result, amplitude feedback information in the last three slots are not transmitted. In such cases, the previous amplitude information is transmitted.

Since there is no feedback information in the first frame of transmission, phase information listed in Table 5 can be used. At the same time, the transmission power from two antennas are divided equally in half from the total transmission power.

TABLE 5

| $FSM_{ph}$ | Phase Difference Between Antennas (radians) $\pi$(normal initialization) or held from previous setting (compressed mode recovery) |
|---|---|
| 0– | $\pi$ |
| 1– | 0 |
| 00– | $\pi$ |
| 01– | $-\pi/2$ |
| 11– | 0 |
| 10– | $\pi/2$ |
| 000 | $\pi$ |
| 001 | $-3\pi/4$ |
| 011 | $-\pi/2$ |
| 010 | $-\pi/4$ |
| 110 | 0 |
| 111 | $\pi/4$ |
| 101 | $\pi/2$ |
| 100 | $3\pi/4$ |

In transmitting data using a plurality of antennas, as in the D-STTD scheme, four transmit antennas can be introduced to the TxAA scheme for MIMO. In a four antenna scheme, or a Double-Transmit Antenna Array (D-TxAA), the transmitted data is divided into two sub-groups and each sub-group is transmitted by the TxAA operation.

Figure 3:
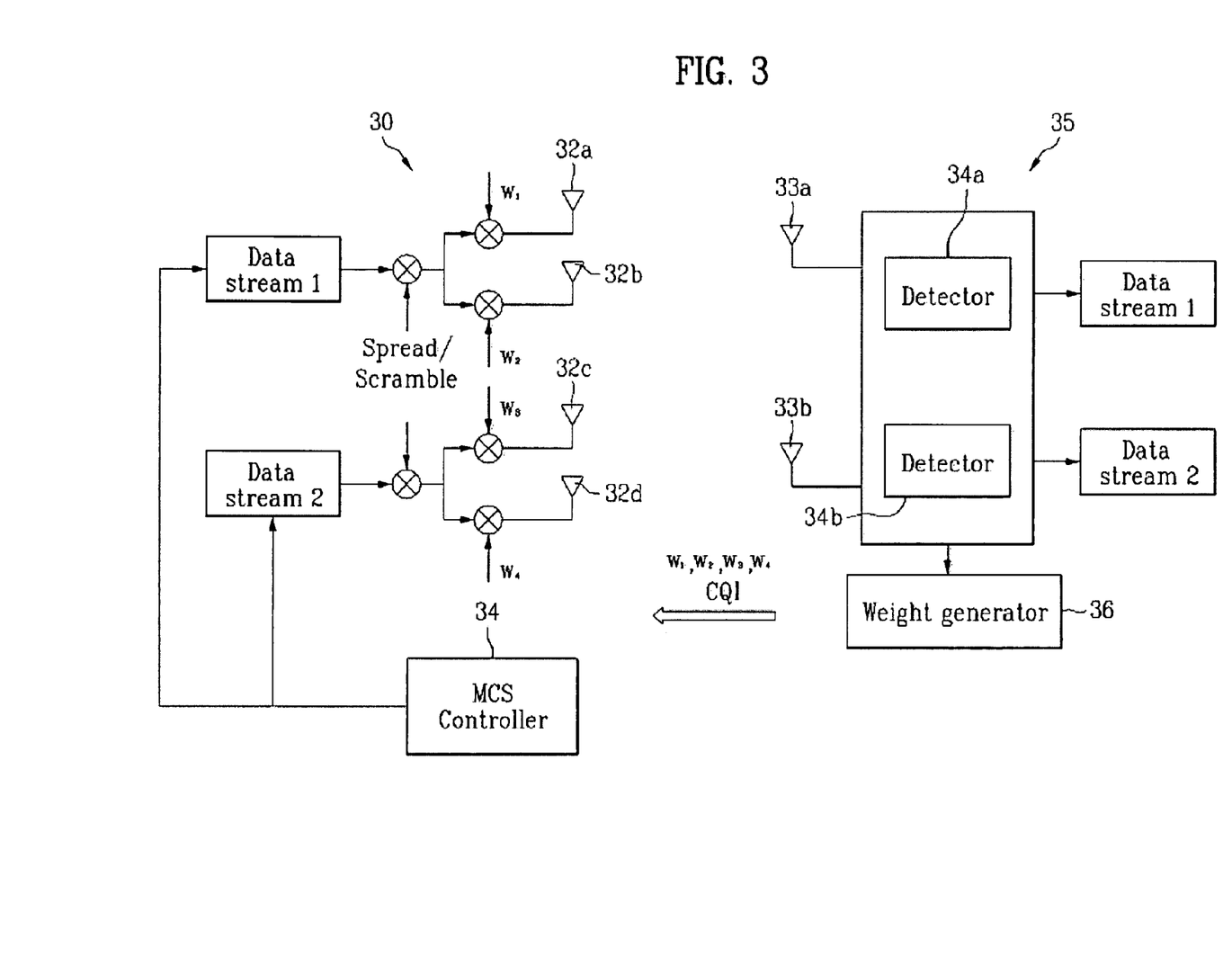
FIG. 3 illustrates a D-TxAA scheme having four transmission antennas and two receiving antennas.

FIG. 3 illustrates a D-TxAA scheme for the (4, 2) antenna configuration. More specifically, there are four transmitting antennas to two receiving antennas. As shown in the figure, the transmit antennas 32a-32d are grouped into two sub-groups. The upper two transmit antennas 32a and 32b transmit data stream 1 and the lower two transmit antennas 32c and 32d transmit data stream 2. A controller (not shown in the drawing) applies weight values received in feedback information from the receiving end 35 to respective antennas and controls transmission of data streams which have been weight-applied to the receiving end 35.

In the receiving end 35, detectors 34a and 34b in the receiving end 35 estimate channel status using pilot signals. The channel status information is used by the weight generator 36 to calculate weight values for each channel. The weight values along with the CQI are fed back to a transmitting end. Based on this information, the weight values are applied to each transmission antenna of each sub-group, according to the following expression $$\begin{pmatrix} w_1 & 0 \\ w_2 & 0 \\ 0 & w_3 \\ 0 & w_4 \end{pmatrix} \begin{pmatrix} s_1 \\ s_2 \end{pmatrix}.$$

After the weight values are applied to each sub-group, each sub-group transmits the data streams to the receiving antennas. The received signals can be presented by the following equation. Here, an assumption is made that there are two receiving antennas.

$$r_1 = (w_1 h_{11} + w_2 h_{12})s_1 + (w_3 h_{13} + w_4 h_{14})s_2 + n_1$$

$$r_2 = (w_1 h_{21} + w_2 h_{22})s_1 + (w_3 h_{23} + w_4 h_{24})s_2 + n_2 \quad \text{[Equation 10]}$$

In this equation, $w_1$-$w_4$ are weight values for each sub-group, $h_{nm}$ is channel coefficient from the m-th transmit antenna to the n-th receive antenna, $s_1$ and $s_2$ are symbols, and $n_1$ and $n_2$ are AWGN vectors.

Since $s_1$ and $s_2$ are transmitted to each receiving antenna, the data can be recovered after filtering out the channel information and weight value from the combined signals. Furthermore, more reliable data recovery can be achieved through an interference cancellation method. In other words, as expressed in Equation 11, if an interference element acquired through data recovery process of $s_1$ can be eliminated, reliability of $s_2$ can be increased.

$$\hat{s}_1 = (w_1 h_{11} + w_2 h_{12})^* r_1 + (w_1 h_{12} + w_2 h_{22})^* r_2$$

$$\hat{s}_2 = (w_3 h_{13} + w_4 h_{14})^* (r_1 - (w_1 h_{11} + w_2 h_{12}) \hat{s} + (w_3 h_{23} + w_4 h_{24})^* (r_2 - (w_1 h_{21} + w_2 h_{22}) \hat{s}_1)$$ [Equation 11]

In this equation, $w_1$-$w_4$ are weight values for each sub-group, $h_{nm}$ is channel coefficient from the m-th transmit antenna to the n-th receive antenna, and $r_1$ and $r_2$ are received signals.

The weight values, fed back to the transmitting end, is an eigenvector corresponding to the eigenvalue derived from the channel matrix.

$$R_{12} = h_{12}{}^H h_{12}, R_{34} = h_{34}{}^H h_{34}$$ [Equation 12]

$$R_{12} w_{12} = \lambda_{12} w_{12}, R_{34} w_{34} = \lambda_{34} w_{34}$$

In Equation 12 and Equation 13, $$h_{12} = \begin{bmatrix} h_{11} & h_{12} \\ h_{21} & h_{22} \end{bmatrix}, h_{34} = \begin{bmatrix} h_{13} & h_{23} \\ h_{14} & h_{24} \end{bmatrix},$$

$R_{12} \cdot R_{34}$ are covariance matrices of $h_{12}$ and $h_{34}$, $\lambda_{12} \cdot \lambda_{34}$ represent the maximum values of the covariance matrices, and $w_{12} = [w_1 \ w_2]^T$, $w_{34} = [w_3 \ w_4]^T$ are the eigenvectors corresponding to maximum eigenvalues, respectively.

The above described method is an example of one of the methods that can be used to acquire weight values. Different methods may be used to obtain weight values.

In the above example, two receiving antennas are provided. However, the D-TxAA scheme can be extended for a configuration having more antennas. For example, the D-TxAA scheme can be extend for the (4, 4) antenna configuration.

As explained above, data rates for sub-groups can be independently controlled. In other words, the data rates for $s_1$ and $s_2$ can be controlled independently depending on the status of the transmission channel. Accordingly, if the channel status is good, transmission can be achieved by using high order modulation, which is similar to Quadrature Amplitude Modulation (QAM), or by increasing the code rate. On the contrary, if the channel status is bad, transmission can be achieved by using a low order modulation, which is similar to Quadrature Phase-Shifting Keying (QPSK), or by decreasing the code rate. To accomplish this, the receiving end transmits as feedback the channel status information to the transmission end.

Figure 4:
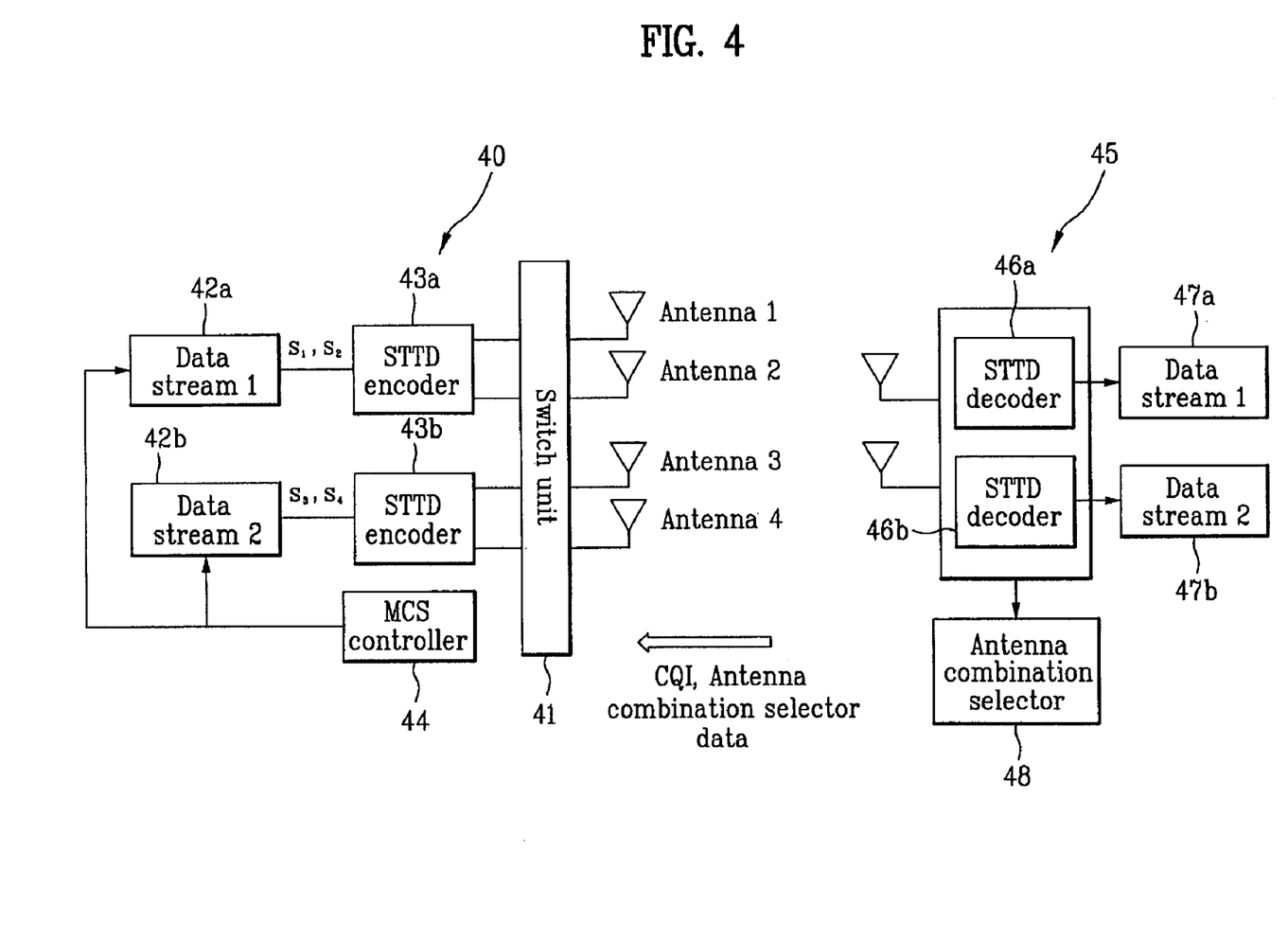
FIG. 4 illustrates a D-STTD scheme having a feature of selecting antenna combinations.

Another embodiment of the present invention relates to maximizing data throughput. In FIG. 4, a Switch Unit 41 in a transmitting end 40 and an Antenna Combination Selector 48 in a receiving end 45 are added to the (4,2) antenna configuration from FIG. 1.

In FIG. 4, the receiving end 45 estimates channel status using pilot signals. The status of estimated channels are used to calculate the SINR for channels of each antenna combination. For instance, the SINR of, not only (1,2)(3,4) antenna combination calculated, other combinations such as (1,3)(2,4) and (1,4)(2,3) are calculated as well. Based on the SINR, the data throughputs of antenna combinations are calculated. Then the antenna combination having the maximum data throughput is selected.

From the receiving end, the selected antenna combination is fed back, along with the CQI, to the transmission end 40. Based on this feedback information, the Switch Unit 41 applies the selected antenna combination. The data streams are then transmitted to the receiving end 45 via selected antenna combination.

Figure 5:
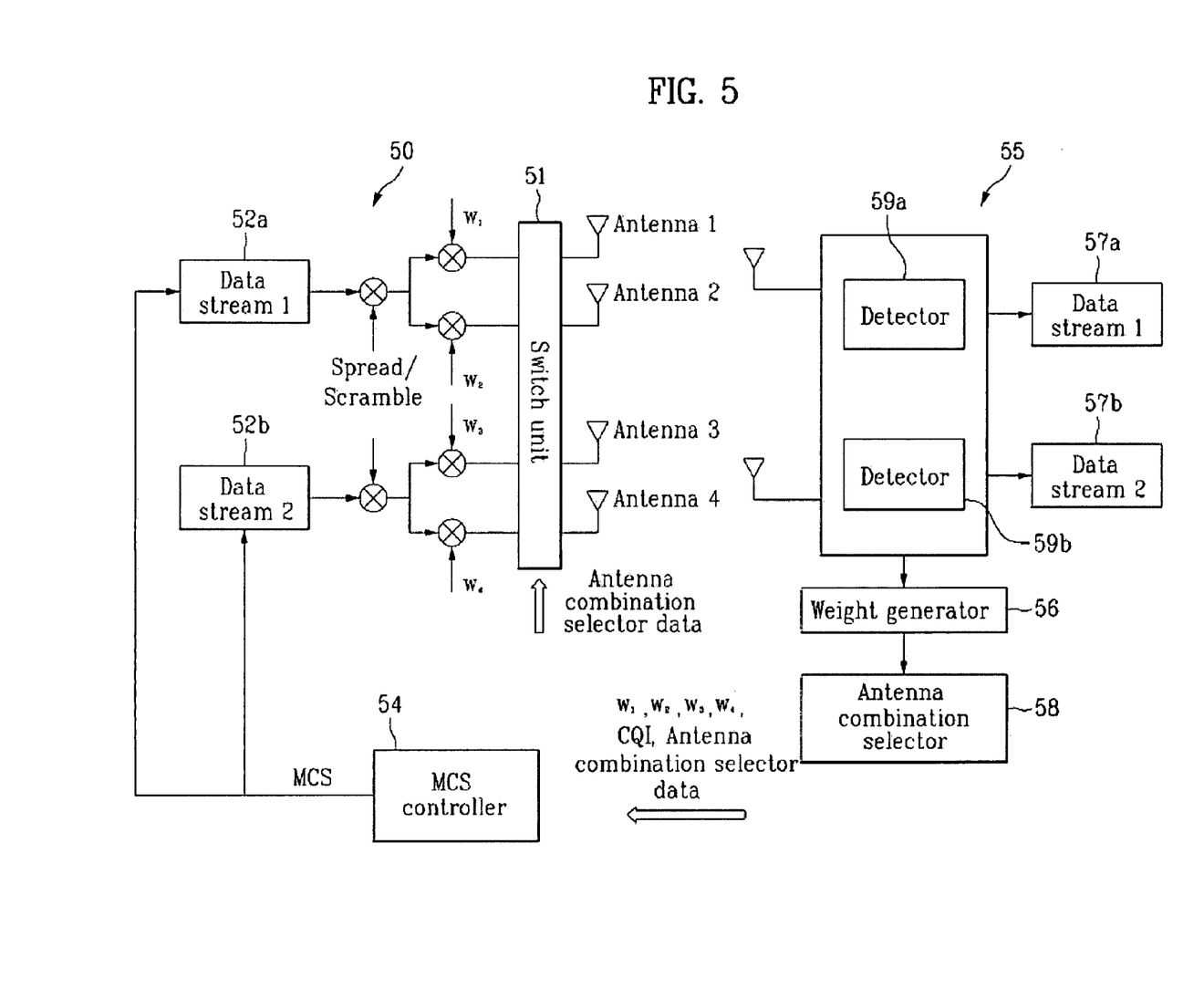
FIG. 5 illustrates a D-TxAA scheme having a feature of selecting antenna combinations.

FIG. 5 is an example of D-TxAA scheme where a capacity to select antenna combinations is made available to a system comprising a plurality of transmitting antennas. In FIG. 5, a Switch Unit 51 in a transmission end 50 and an Antenna Combination Selector 53 in a receiving end 55 are added to the (4,2) antenna configuration of FIG. 3.

In FIG. 5, detectors 59a and 59b in the receiving end 55 estimate channel status using pilot signals. The estimated channel status information is used by the weight generator 56 to calculate weight values for each combination of antennas as well as for each antenna. Furthermore, the SINR for channels of each antenna combination are calculated by using the estimated channel status information. For instance, the SINR of, not only (1,2)(3,4) antenna combination calculated, other combinations such as (1,3)(2,4) and (1,4)(2,3) are calculated as well. The SINR of each antenna can also be calculated by using the estimated channel status information. For example, the SINR of not only of (1,2)(3,4) antenna combination calculated, the SINR of each antenna (e.g., antenna 1, antenna 2, etc.) may also be calculated. Based on the SINR of each antenna combination, the data throughputs of each antenna combination are calculated from which the antenna combination having the maximum data throughput is selected.

The selected antenna combination is fed back, along with the weight values and the CQI, to the transmitting end 50. Based on this feedback information, the Switch Unit 51 applies the selected antenna combination. Furthermore, the weight values are applied to each antenna of the sub-groups. The data streams are then transmitted to the receiving end 55 via selected antenna combination.

Figure 6:
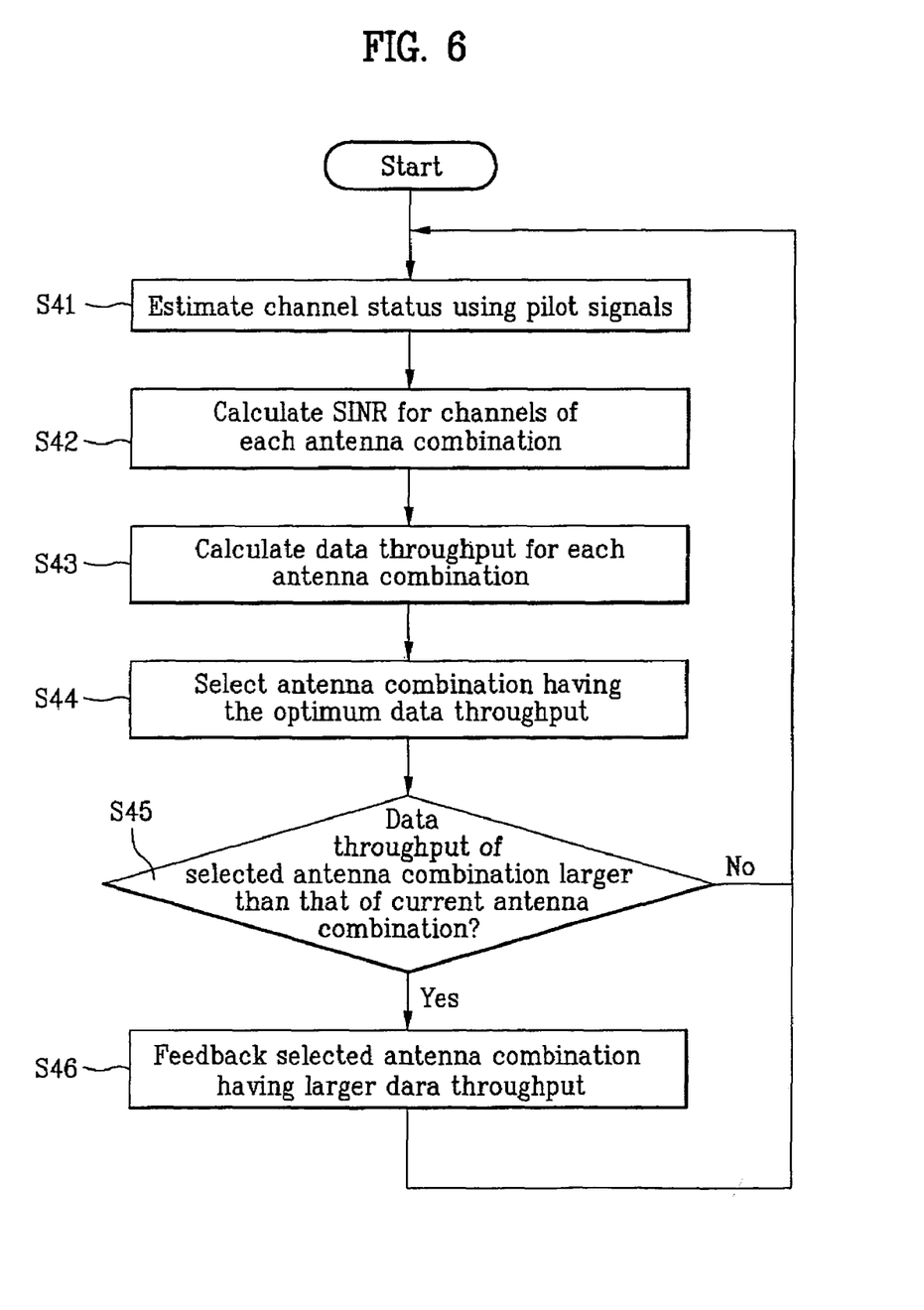
FIG. 6 illustrates a flowchart showing a process of selecting antenna combinations in the receiving end.

FIG. 6 shows the process of selecting antenna combinations in the receiving end 45 of a D-STTD and D-TxAA diversity. With numerous antenna combinations available, the antenna combination having a maximum data throughput is selected.

In FIG. 6, channel status is estimated using pilot signals (S41). Based on the estimated channel status information, the SINR for channels of each antenna combination are calculated (S42). Furthermore, available data throughput for each antenna combination is calculated (S43). After calculation of data throughput is completed, the antenna combination having the maximum data throughput is selected (S44). The selected antenna combination having the maximum data throughput is compared to the antenna combination of the current antenna combination (S45). If the selected antenna combination has a larger data throughput, the selected antenna combination is fed back to the transmitting end (S46). If the data throughput amount of the selected antenna combination is same or less than that of the current antenna combination, then no feedback is transmitted. In such cases, the transmitting end transmits the data based on the current antenna combination.

The foregoing process of selecting antenna combination is not limited to a D-STTD and D-TxAA scheme, but can be applied to other transmission schemes. Moreover, the combination of antennas is not limited to above described combinations, but can use other combinations. Furthermore, a number of antennas in sub-groups could increase with increase in number of transmission antennas.

Before transmission of feedback takes place with respect to the selected antenna combination, the data throughputs of the selected antenna combination and the current antenna combination should be compared. If the amount of data throughput of the selected antenna combination is similar, same, or even lower than the current (or initial) antenna combination, feedback need not take place. The reason for this is to reduce increase in uplink/downlink signaling of feedback data and downlink control signal which may take place periodically or every time a change in channel status occurs. Therefore, selected antenna combination should replace the current (or initial) antenna combination when there is substantial difference in data throughput and at initial system connection or set up. The reason for this is to reduce increase in uplink/downlink signaling of feedback data and downlink control signal which may take place periodically or every time a change in channel status occurs.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for transmitting data streams, said method comprising:
receiving feedback information including four weighting values, wherein each of the four weighting values is associated with a corresponding one of four antennas;
generating four weighted data streams by applying the following matrix of weighting values to a first data stream $s_1$ and a second data stream $s_2$ $$\begin{pmatrix} w_1 & 0 \\ w_2 & 0 \\ 0 & w_3 \\ 0 & w_4 \end{pmatrix} \begin{pmatrix} s_1 \\ s_2 \end{pmatrix}$$

wherein $w_1$, $w_2$, $w_3$ and $w_4$ represent the four weighting values, respectively; and
transmitting two of the four weighted data streams over a corresponding first set of the antennas, and transmitting the two remaining weighted data streams over a corresponding second set of the antennas, respectively.

2. The method of claim 1, wherein transmitting the weighted data streams results in two receiving antennas receiving a combined signal as shown by the following equations, respectively:

$$r_1 = (w_1 h_{11} + w_2 h_{12}) s_1 + (w_3 h_{13} + w_4 h_{14}) s_2$$

$$r_2 = (w_1 h_{21} + w_2 h_{22}) s_1 + (w_3 h_{23} w_4 h_{24}) s_2$$

wherein $r_1$ and $r_2$ represent the signals received at the two receiving antennas, $h_{11}$, $h_{12}$, $h_{21}$, $h_{22}$, are the channels over which the first weighted data streams are transmitted, and $h_{13}$, $h_{14}$, $h_{23}$ and $h_{24}$ are the channels over which the second weighted data streams are transmitted.

3. The method of claim 1, wherein receiving feedback information including four weighting values comprises:
receiving the feedback information at a transmission end from a receiving end.

4. The method of claim 3, wherein the feedback information further includes channel quality information (CQI).

5. The method of claim 4, wherein transmitting each of the weighted data streams comprises:
transmitting each of the weighted data streams at a corresponding data rate, and wherein the data rate associated with each of the weighted data streams is variable and independent of the data rate associated with the other three weighted data streams.

6. The method of claim 5, wherein the data rate associated with each of the weighted data streams is based on the CQI.

7. The method of claim 5, wherein the data rate associated with each of the weighted data streams is based on the corresponding weighting value.

8. The method of claim 3 further comprising:
combining the four antennas into two sets of antennas, wherein the first set of antennas comprises two of the four antennas and the second set of antennas comprises the remaining two antennas.

9. The method of claim 8, wherein the two antennas associated with each of the two groups is variable.

10. The method of claim 9, wherein the feedback information further includes information that defines which antennas correspond to the first set of antennas and which antennas correspond to the second set of antennas.

* * * * *